May 1, 1962   J. D. GREENSTREET   3,032,354
AUTOMATIC STEERING FOR A TRAILER
Filed Jan. 23, 1961
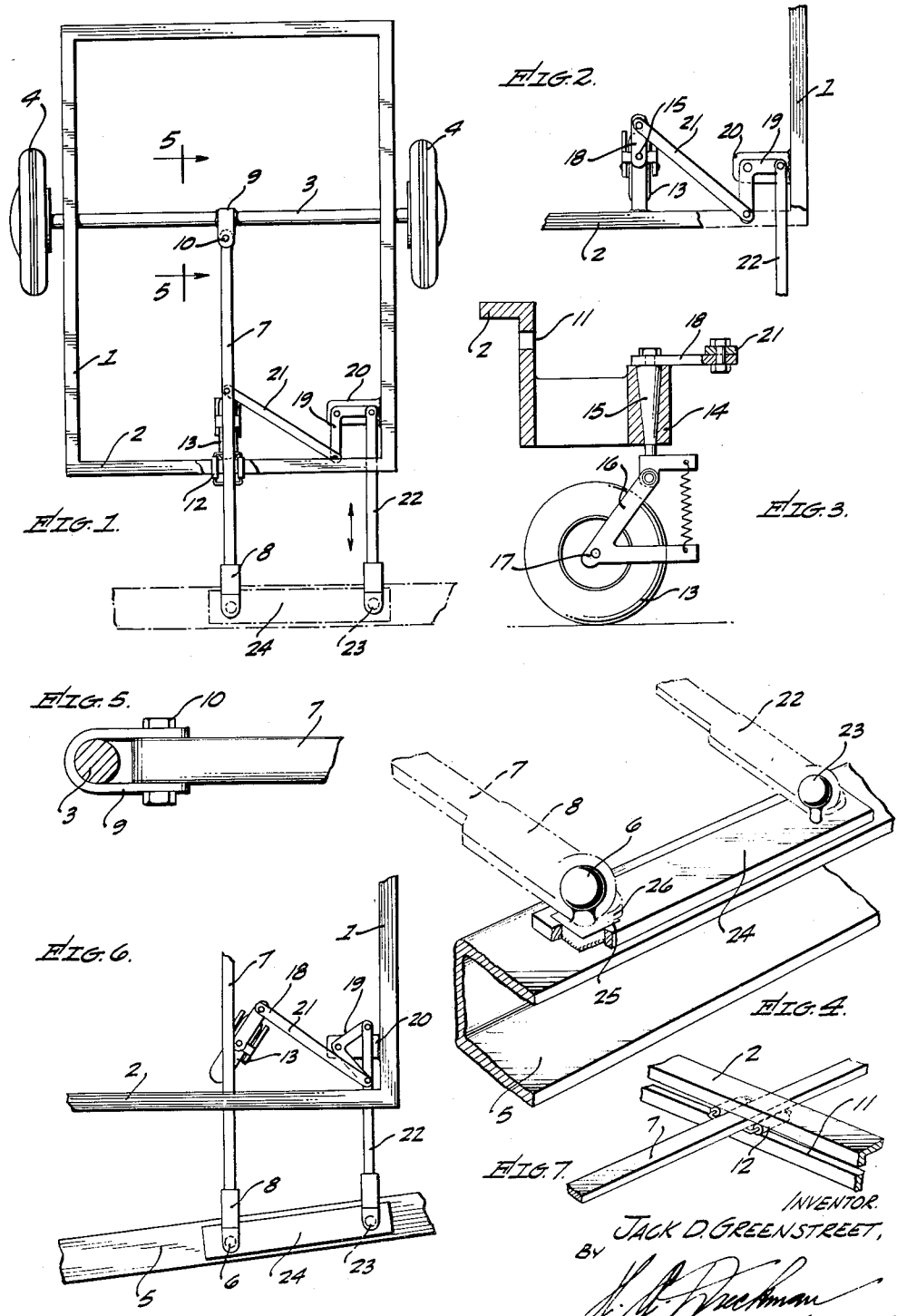
INVENTOR.
JACK D. GREENSTREET,
BY
ATTORNEY.

United States Patent Office 3,032,354
Patented May 1, 1962

3,032,354
AUTOMATIC STEERING FOR A TRAILER
Jack D. Greenstreet, Palm Springs, Calif.
(2150 Earl Ave., Long Beach 6, Calif.)
Filed Jan. 23, 1961, Ser. No. 84,243
5 Claims. (Cl. 280—443)

This invention relates to an automatic steering mechanism for trailers whereby a trailer is caused to track directly in the path of the pulling vehicle.

An object of my invention is to provide a trailer guide which will accurately track the trailer in the path of the pulling vehicle on both forward and rearward movement of the pulling vehicle, that is, the trailer will move in the same direction as the rear wheels of the pulling vehicle.

Another object is to provide a novel means of steering the wheels of a trailer by means of an offset castor wheel mounted on the frame of the trailer, whereby on forward movement of the pulling vehicle the castor wheel will trail in one direction, and on rearward movement of the pulling vehicle the castor wheel is reversed in position to again cause the trailer to accurately track the pulling vehicle.

Another object of my invention is to provide a novel means of reversing the position of the castor wheel, depending upon the direction of movement of the pulling vehicle, and also the position of the pulling vehicle with relation to the trailer.

Another object of my invention is to provide a novel trailer steering mechanism which will automatically properly steer the wheels of a trailer on both the forward and rearward movement of the pulling vehicle.

Other objects, advantages and features of invention may appear from the accompanying drawing, the subjoined detailed description and the appended claims.

In the drawing:

FIGURE 1 is a plan view of my trailer guide mounted on a trailer.

FIGURE 2 is a fragmentary plan view of the castor wheel shifting mechanism with parts broken away to show hidden construction.

FIGURE 3 is a side elevation of the castor wheel with the bearing shown in section.

FIGURE 4 is a fragmentary perspective view showing the attachment of the steering mechanism to the rear bumper of the pulling vehicle.

FIGURE 5 is a fragmentary side elevation of the coupling attachment of the drawbar to the axle.

FIGURE 6 is a top plan view of the steering mechanism showing the parts in another position.

FIGURE 7 is a fragmentary perspective view of the frame of the trailer showing the drawbar extending therethrough.

Referring more particularly to the drawing, the trailer consists of a substantially rectangular frame 1 which includes a front member 2, the details of which will be subsequently described. A nonrotatable axle 3 is mounted on the frame 1 of the trailer, and the wheels 4 are journaled on this axle. A rear bumper 5 of the pulling vehicle is provided with a ball 6 on the top thereof, which ball is engaged by the drawbar 7. The drawbar 7 is provided with a socket 8 at the forward end thereof, which fits over the ball 6 and permits a free swinging movement of the drawbar 7 from side to side, as might be necessary as the pulling vehicle is steered. At the rear end of the drawbar 7 a bracket 9 is provided on the axle 3, and a pivot pin 10 extends through the bracket and through the drawbar 7 to pivotally mount the drawbar on the axle. Thus the trailer is effectively pulled by the pulling vehicle through the drawbar 7, and this drawbar can move from side to side of the trailer frame 1 about the pivot 10. The front member 2 of the frame 1 of the trailer has a long slot 11 therein through which the drawbar 7 extends. The drawbar may be provided with rollers 12 which are fitted in the slot 11 and thus permit the drawbar to swing from side to side on bearings which will permit easy movement.

A castor wheel 13 is pivotally mounted on the frame 1 of the trailer and preferably on the front member 2 of the frame in the following manner: A bearing 14, attached to the frame member 2, receives a vertical pin 15 which rises from the frame 16 of the castor wheel 13. The bearing pin 17 of the castor wheel 13 is offset horizontally from the vertical center line of the bearing pin 15, so that the castor wheel will always tend to trail the direction of movement of the trailer; that is, the castor wheel 13 will be in one position when the trailer moves forwardly, and will rotate through 180° when the trailer moves rearwardly. This rotation of the castor wheel 13 about its vertical bearing 15 is accomplished by proper linkage, as will be subsequently described. An arm 18 is fixedly secured to the upper end of the pivot pin 15, and this arm extends horizontally and substantially in the same plane as the frame 16 of the castor wheel 13.

A bell crank lever 19 is pivotally mounted on a bracket 20 which projects from the frame 1 of the trailer. A drag link 21 is pivotally attached at one end to the arm 18 and at the other end to one arm of the bell crank 19. An actuating strap 22 is pivotally attached at one end to another arm of the bell crank lever 19, and is also mounted on the ball 23 at its forward end. The ball 23 is mounted on a plate 24 which rests on top of the bumper 5 and is secured to the ball 6 in the following manner: The base of the ball 6 consists of a square block, as shown at 25, and the plate 24 has a square hole 26 therein which accurately fits the square base. The ball 23 is fixedly mounted on the plate 24 and is spaced horizontally from the ball 6. The actuating strap 22 and the drawbar 7 are thus substantially parallel when the pulling vehicle is moving in a straightforward direction. When the pulling vehicle turns either to the left or to the right the actuating strap 27 will be caused to move either forwardly or rearwardly to swing the bell crank 19 about its pivot. The movement of the bell crank 19 will push or pull on the drag link 21 which, in turn, swings the arm 18, rotating the pivot pin 15 which will urge the castor wheel 13 to move about the vertical center line of the pivot pin 15. The bell crank lever 19 is so positioned that the arm 18 can move through an arc of 180°, in order that the castor wheel 13 may move into a position which trails the direction of movement of the trailer frame 1. This is accomplished by the proper proportioning of the length of the arm 18, and also the length of the drag link 21, as well as the proper positioning of the bell crank lever 19.

Since the drag link 21 and the arm 18 move in different arcs as the castor wheel 13 rotates on its pivot 15, it is necessary to provide for this required movement. To permit pivotal movement between the arm 18 and the drag link 21 the entire frame 1 of the trailer will swing to one side or the other, to permit the arm 18 and the drag link 21 to pass over the high point of the intersections of the arcs of movement of these two parts. In other words, the entire front end of the trailer frame 1 will shift slightly from one side to the other to permit the parts to rotate, and allowing the castor wheel 13 to pivot from one position to another, depending upon the direction of movement of the trailer. Also the castor wheel 13 will be steered, due to the lengthwise movement of the actuating strap 22 as the bumper 5 swings horizontally with the movement of the pulling vehicle. By this means the trailer is caused to move in the same direction as the rear wheels of the pulling vehicle, and will accurately follow the movements of that pulling vehicle. When the pulling vehicle is moved forwardly and towing the trailer, the drawbar 7 is pivotally attached to the axle 3 as described and, consequently, there would be no whipping action of the trailer imparted to the pulling vehicle, since any slight whipping or horizontal motion of the frame of the trailer would not be transmitted to the bumper of the pulling vehicle due to the pivot 10.

Having described my invention, I claim:

1. In combination with a trailer including a frame, an axle mounted on the frame and wheels on the axle, an automatic steering means for the trailer consisting of a castor wheel, means pivotally mounting the castor wheel on said frame, a drawbar pivotally attached at one end to said axle, and at the other end to a pulling vehicle, a bell crank pivotally mounted on said frame, an actuating strap pivotally secured at one end to the pulling vehicle and at the other end to said bell crank, a drag link pivotally attached at one end to the bell crank, and at the other to the pivotal mounting means of said castor wheel, said drawbar and actuating strap being horizontally spaced and substantially parallel during forward movement of the pulling vehicle.

2. In combination with a trailer including a frame, an axle mounted on the frame and wheels on the axle, an automatic steering means for the trailer consisting of a castor wheel, means pivotally mounting the castor wheel on said frame, a drawbar pivotally attached at one end to said axle, and at the other end to a pulling vehicle, a bell crank pivotally mounted on said frame, an actuating strap pivotally secured at one end to the pulling vehicle and at the other end to said bell crank, a drag link pivotally attached at one end to the bell crank, an arm projecting from the pivotal mounting means of the castor wheel, one end of the bell crank being pivotally attached to said arm and said drawbar, an actuating strap being horizontally spaced and substantially parallel during forward movement of the pulling vehicle.

3. In combination with a trailer including a frame, an axle mounted on the frame and wheels on the axle, an automatic steering means for the trailer consisting of a castor wheel, a bearing on said frame, a bearing pin journaled in the bearing and extending vertically from the castor wheel, the center of rotation of the castor wheel being horizontally spaced from said pivot pin, a drawbar pivotally attached at one end to said axle, and at the other end to a pulling vehicle, a bell crank pivotally mounted on said frame, an actuating strap pivotally secured at one end to the pulling vehicle and at the other end to said bell crank, and a drag link pivotally attached at one end to the bell crank and at the other to an arm projecting from said pivot pin on the castor wheel.

4. In combination with a trailer including a frame, an axle mounted on the frame and wheels on the axle, an automatic steering means for the trailer consisting of a castor wheel, a bearing on said frame, a bearing pin journaled in the bearing and extending vertically from the castor wheel, the center of rotation of the castor wheel being horizontally spaced from said pivot pin, a drawbar pivotally attached at one end to said axle, and at the other end to a pulling vehicle, a bell crank pivotally mounted on said frame, an actuating strap pivotally secured at one end to the pulling vehicle and at the other end to said bell crank, and a drag link pivotally attached at one end to the bell crank and at the other to an arm projecting from said pivot pin on the castor wheel, said drawbar and actuating strap being horizontally spaced and substantially parallel during forward movement of the pulling vehicle.

5. In combination with a trailer including a frame, an axle mounted on the frame and wheels mounted on the axle, an automatic steering means for the trailer consisting of a castor wheel, means pivotally mounting the castor wheel on said frame, said castor wheel being mounted on a vertical axis, a rear bumper on the pulling vehicle, a ball mounted on said rear bumper, a rectangular base on the ball, said rectangular base being positioned on the upper surface of the bumper, a plate resting on the upper surface of the bumper, said plate having a rectangular hole therein to fit the rectangular base of said ball, a second ball on said plate spaced from the first named ball, a drawbar pivotally attached at one end of said axle and at the other end to the first named ball, a bell crank pivotally mounted on said frame, an actuating strap pivotally secured at one end to the second named ball and at the other end to said bell crank, a drag link pivotally attached at one end to the bell crank and at the other to the pivotally mounted means of said castor wheel, said drawbar and actuating strap being horizontally spaced and substantially parallel during forward movement of the pulling vehicle.

References Cited in the file of this patent

UNITED STATES PATENTS

| | | |
|---|---|---|
| 2,052,645 | Norman | Sept. 1, 1936 |
| 2,134,351 | Arehart | Oct. 25, 1938 |
| 2,157,998 | Callaway | May 9, 1939 |

FOREIGN PATENTS

| | | |
|---|---|---|
| 589,649 | France | Feb. 26, 1925 |
| 2,639,159 | Milligan et al. | May 19, 1953 |
| 2,695,181 | Pankonin | Nov. 13, 1954 |